(12) United States Patent
Baggs et al.

(10) Patent No.: US 8,619,313 B2
(45) Date of Patent: Dec. 31, 2013

(54) SCANNING DEVICE WITH PLURAL IMAGE CAPTURE ZONES ON A PLATEN

(75) Inventors: Scott C. Baggs, Fort Collins, CO (US); Thomas Mitchell, Laporte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1733 days.

(21) Appl. No.: 11/261,143

(22) Filed: Oct. 28, 2005

(65) Prior Publication Data

US 2007/0098394 A1 May 3, 2007

(51) Int. Cl.
*H04N 1/04* (2006.01)
*G06K 15/00* (2006.01)
*G06K 15/02* (2006.01)
*H04N 1/193* (2006.01)

(52) U.S. Cl.
CPC ............... *G06K 15/02* (2013.01); *H04N 1/193* (2013.01)
USPC .......................................... 358/1.18; 358/474

(58) Field of Classification Search
USPC ............... 358/1.18, 488, 505, 1.15, 497, 494, 358/474, 487, 506, 527; 382/293–297; 399/379, 380, 377, 378; 355/75
See application file for complete search history.

(56) References Cited

U.S. PATENT DOCUMENTS

| | | | |
|---|---|---|---|
| 4,620,234 A | 10/1986 | Watanabe | |
| 4,646,144 A * | 2/1987 | Ishida et al. | 358/517 |
| 4,825,250 A * | 4/1989 | Miyata et al. | 399/82 |
| 4,935,809 A * | 6/1990 | Hayashi et al. | 358/527 |
| 5,278,673 A | 1/1994 | Scapa et al. | |
| 5,905,817 A * | 5/1999 | Matama | 382/260 |
| 5,966,116 A | 10/1999 | Wakeland | |
| 5,973,765 A * | 10/1999 | Uchiyama et al. | 355/40 |
| 5,974,199 A * | 10/1999 | Lee et al. | 382/296 |
| 6,148,149 A | 11/2000 | Kagle | |
| 6,157,440 A * | 12/2000 | Ikeda | 355/75 |
| 6,233,037 B1 * | 5/2001 | Ueda et al. | 355/40 |
| 6,275,622 B1 | 8/2001 | Krtolica | |
| 6,310,986 B2 | 10/2001 | Robey et al. | |
| 6,337,698 B1 * | 1/2002 | Keely et al. | 715/823 |
| 6,344,906 B1 | 2/2002 | Gatto et al. | |
| 6,345,118 B1 | 2/2002 | Ideyama | |
| RE38,471 E | 3/2004 | Howard et al. | |
| 6,738,154 B1 * | 5/2004 | Venable | 358/1.15 |
| 6,842,265 B1 * | 1/2005 | Votipka et al. | 358/1.16 |
| 6,847,385 B1 | 1/2005 | Garritsen | |

(Continued)

FOREIGN PATENT DOCUMENTS

| EP | 0411698 A3 | 2/1991 | |
|---|---|---|---|
| EP | 961471 A2 * | 12/1999 | H04N 1/00 |

(Continued)

OTHER PUBLICATIONS

"Epson Expression 10000XL Color Flatbed Scanner", Epson America Inc, 2004, pp. 1-2.*

(Continued)

*Primary Examiner* — Jerome Grant, II

(57) ABSTRACT

An image capture device comprises an output settings module configured to receive a selection of at least one output setting for at least one of a plurality of objects to be concurrently imaged by the image capture device, the at least one output setting automatically applied to a scanned image of the at least one object.

34 Claims, 2 Drawing Sheets

(56) References Cited

U.S. PATENT DOCUMENTS

| | | | |
|---|---|---|---|
| 6,873,400 B2* | 3/2005 | Murakami et al. | 355/53 |
| 7,265,878 B2* | 9/2007 | Liu | 358/474 |
| 7,630,107 B2* | 12/2009 | Ichikawa et al. | 358/516 |
| 2001/0015830 A1* | 8/2001 | Matsuda | 358/474 |
| 2002/0131174 A1 | 9/2002 | Leigh-Jones et al. | 359/569 |
| 2003/0123112 A1* | 7/2003 | Kajita et al. | 358/538 |
| 2004/0145784 A1* | 7/2004 | Murray et al. | 358/474 |
| 2004/0167709 A1* | 8/2004 | Smitherman et al. | 701/208 |
| 2004/0181749 A1* | 9/2004 | Chellapilla et al. | 715/505 |
| 2004/0190025 A1* | 9/2004 | Nomura et al. | 358/1.9 |
| 2005/0024681 A1* | 2/2005 | Tehrani et al. | 358/1.18 |
| 2005/0110882 A1* | 5/2005 | Fukuda | 348/234 |
| 2005/0119551 A1* | 6/2005 | Maschke | 600/407 |
| 2005/0212819 A1* | 9/2005 | Kubo et al. | 345/619 |
| 2006/0059426 A1* | 3/2006 | Ogikubo | 715/723 |
| 2007/0097451 A1* | 5/2007 | Marappan | 358/453 |

FOREIGN PATENT DOCUMENTS

| | | |
|---|---|---|
| EP | 0978985 A3 | 2/2000 |
| GB | 2306071 A | 4/1997 |
| GB | 2306072 A | 4/1997 |
| WO | WO 97/05736 | 2/1997 |

OTHER PUBLICATIONS

World Wide Web, http://www.hp.com/cposupport/scanners/support_doc/bps50000.html Hewlett-Packard Company, "HP Digital Sender 8100C—Product Specific", printed on Mar. 8, 2002, 8 pages.

World Wide Web, http://www.bstore.hpcom/cgi-bin/hpbs, HP Invent, "hp digital sender 8100c" ,hp business store—Product Detail Page, printed on Feb. 20, 2002, 1 page.

World Wide Web, http://www.bstore.hp.com/cgi-bin/hpbs, HP Invent, "hp photosmart s20xi photo scanner", printed on Feb. 20, 2002, 1 page.

World Wide Web, hppt://www.amazon.com/exec/obidos/ASIN/B00005BCOH, Amazon.com, "C Pen 800C Handheld Scanner", printed on Feb. 21, 2002, 2 pages.

World Wide Web, http://www.amazon.com/exec/obidos/ASIN/B00004V UHO, Amazon.com, "WizCom QuickLink Pen Handheld Scanner", printed on Feb. 21, 2002, 1 page.

World Wide Web, http://www.bstore.hp.com/cgi-bin/hpbs, HP Invent, "hp scanjet 7450c scanner", hp business store—Product Detail Page, printed on Feb. 20, 2002, 1 page.

World Wide Web, http://www.hp.com/cposupport/scanners/support_doc/bps80171.html, HP Invent, "HP Capshare 920 Portable E-Copier—HP Capshare 920 Portable E-Copier Sells Out by Popular Demand", printed on Feb. 20, 2002, 1 page.

World Wide Web, http://products.hp-at-home.com/series, "hp LaserJet 3200 printer/fax/copier/scanner series", printed on Feb. 21, 2002, 1 page.

World Wide Web, http://products.hp-at-home.com/series, "hp printer/scanner/copier 700 series", printed on Feb. 21, 2002, 1 page.

World Wide Web, http://www.irisusa.com/products/irispen/index.html, "IRISPen: handheld scanner by IRIS", printed on Feb. 21, 2002, 1 page.

* cited by examiner

# SCANNING DEVICE WITH PLURAL IMAGE CAPTURE ZONES ON A PLATEN

BACKGROUND OF THE INVENTION

Image capture devices (e.g., scanners, copiers, etc.) have been developed to scan or generate an image of an object and deliver the image of the object to a selected destination (e.g., a file, printer, etc.). However, the image of the object does not always arrive at the selected destination as desired by the user (e.g., the image may arrive at the selected destination in a portrait orientation but the user may desire the image to be displayed in a landscape orientation). Thus, the user must then rotate or manipulate the image using editing software, which is cumbersome and time-consuming for the user.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
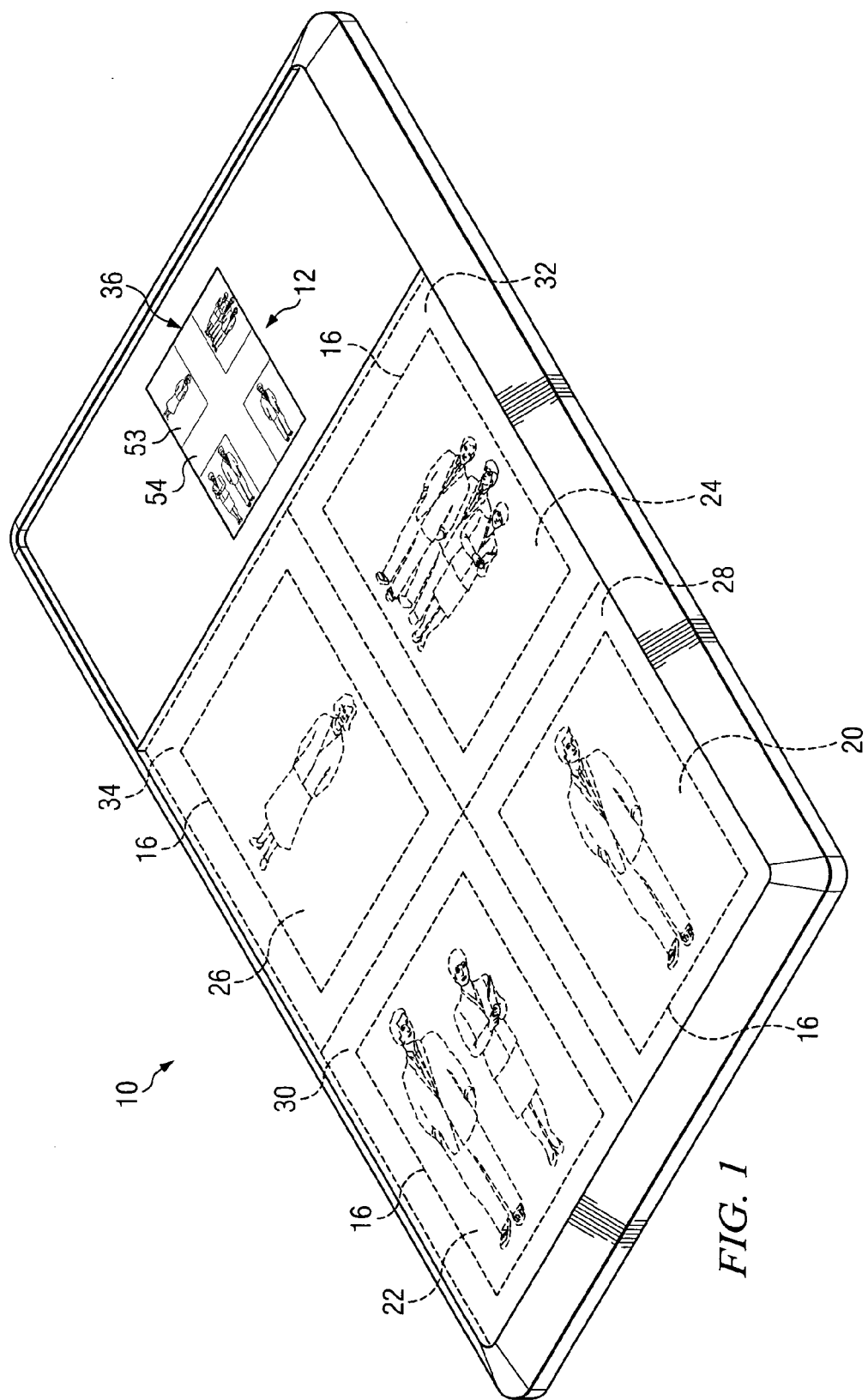
FIG. 1 is a diagram illustrating an image capture device in which an output settings module in accordance with the present invention is employed to advantage.
Figure 2:
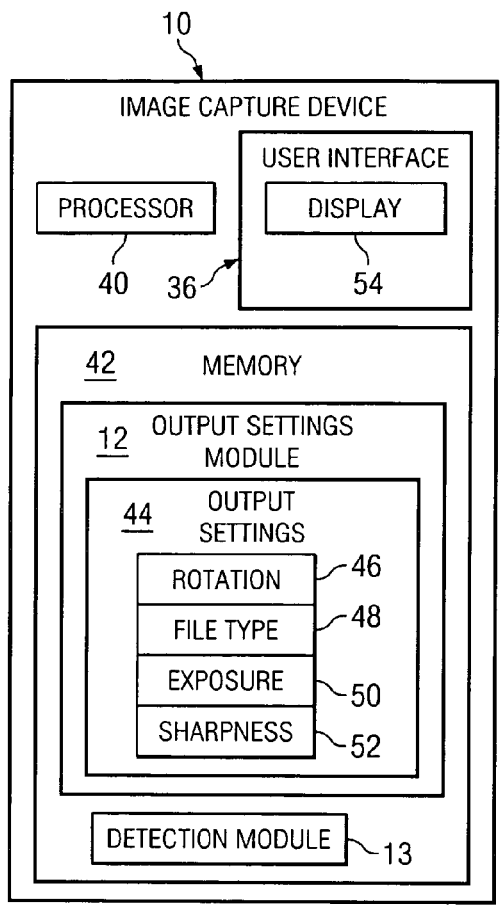
FIG. 2 is a block diagram illustrating an embodiment of an image capture device with an output settings module in accordance with the present invention.
Figure 3:
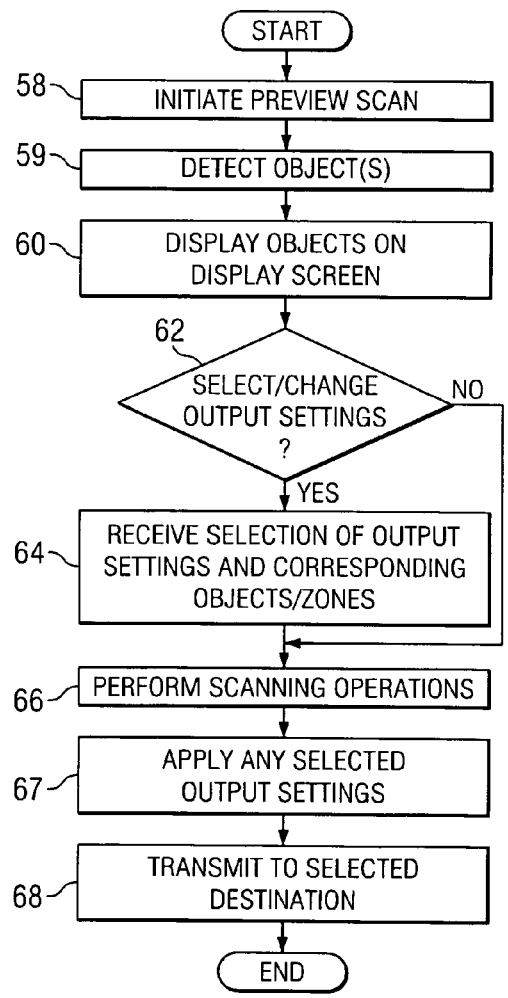
FIG. 3 is a flow diagram illustrating an embodiment of an output settings method for an image capture device in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an image capture device 10 in which an output settings module 12 is employed to advantage in accordance with the present invention. In the embodiment illustrated in FIG. 1, image capture device 10 is used to concurrently scan or image a plurality of objects 16 disposed on a platen 18 of image capture device 10 (e.g., scan multiple objects 16 during a single scanning pass of image capture device 10). In the embodiment illustrated in FIG. 1, objects 16 comprise four photographs 20, 22, 24 and 26; however, it should be understood that a greater or fewer number of objects 16 may be disposed on platen 18 for concurrent imaging by image capture device 10 and different types and/or combinations of objects 16 may be imaged (e.g., slides, business cards, etc., or a combination of photographs, slides, business cards, etc.). It should be understood that image capture device 10 may comprise any type of device for generating an image of an object such as, but not limited to, a scanner, facsimile machine, photocopier and printer.

In the embodiment illustrated in FIG. 1, platen 18 comprises four image capture zones 28, 30, 32 and 34 for receiving and imaging photographs object(s) 16 disposed respectively within each zone 28, 30, 32 and 34. In FIG. 1, image capture zones 28, 30, 32 and 34 are quadrants of platen 18 sized to receive photographs 20, 22, 24 and/or 26; however, it should be understood that the image capture zones of image capture device 10 may be otherwise sized (e.g., for different types of object(s) 16) and may be greater or fewer in number. In operation, image capture device 10 detects the presence of each object 16, or objects 16, disposed within a corresponding image capture zone (e.g., hardware and/or software of image capture device 10 that detects borders of objects 16 and/or otherwise identifies the presence of object(s) 16 within a particular image capture zone during a preview scan operation or otherwise) for imaging and transmission of an image of the object(s) 16 to a selected or desired destination, such as, but not limited to, a remote computer device and/or a printer. It should also be understood that image capture device 10 may be configured without distinct image capture zones (e.g., image capture device 10 configured to detect the presence of each object 16 disposed on platen 18 regardless of its position on platen 18).

In the embodiment illustrated in FIG. 1, image capture device 10 is configured to receive user input (e.g., via a user interface 36 or other input device) to select/change the output characteristics (e.g., image orientation, file type, image sharpness, image exposure, etc.) for images of object(s) 16 generated from each image capture zone 28, 30, 32 and/or 34 prior to scanning the object(s) 16 (e.g., prior to performing a final or subsequent scanning operation of the object(s) 16) and/or transmitting the image(s) of the object(s) 16 to the selected destination. In the embodiment illustrated in FIG. 1, user interface 36 comprises a display screen 54 configured to receive user input to select/change the output characteristics (e.g., by touchscreen input). However, it should be understood that user interface 36 may be otherwise configured. In FIG. 1, image capture device 10 is configured to display a reduced-size preview image 53 of object(s) 16 disposed within each of the zones 28, 30, 32 and 34 and/or a reduced-size preview image 53 of each zone 28, 30, 32 and 34 to enable a user to visually identify and select particular object(s) 16 and/or zones for which the user desires to change an output characteristic (e.g., image orientation, file type, image sharpness, image exposure, etc.). Thus, in some embodiments, user interface 36 is configured with a menu of output characteristic options that are selectable by the user and that are applied to a particular object 16 by the user selecting the corresponding object 16 on the preview display screen 54. However, it should be understood that user interface 36 may be otherwise configured.

FIG. 2 is a block diagram illustrating image capture device 10 of FIG. 1 with output settings module 12. In the embodiment illustrated in FIG. 2, image capture device 10 comprises a processor 40, a memory 42 and user interface 36. In the embodiment illustrated in FIG. 2, memory 42 comprises output settings module 12 and detection module 13. Output settings module 12 and detection module 13 may comprise hardware, software, or a combination of hardware and software. In FIG. 2, output settings module 12 and detection module 13 are illustrated as being stored in memory 42 so as to be accessible and executable by processor 40. However, it should be understood that output settings module 12 and/or detection module 13 may be otherwise located or stored. Output settings module 12 enables a user to select/change the output characteristics of each image capture zone 28, 30, 32 and/or 34 and/or particular object(s) 16 prior to producing a final scanned image of corresponding object(s) 16 and/or prior transmitting the scanned images to a selected destination. Output settings module 12 automatically applies the selected output characteristics and/or otherwise causes such output characteristics to be applied to the scanned images of the object(s) 16 (e.g., by interfacing with other image processing software and/or hardware of image capture device 12). The selected output characteristics may be applied to the preview image 53 of the object(s) 16 (e.g., on display screen 54) and/or automatically applied to a subsequently scanned image of the object(s) 16. Detection module 13 is used to automatically detect object(s) 16 on platen 18 (e.g., by detecting borders, edges and/or other defined features of object(s) 16 so as to distinguish between different objects 16 disposed on platen 18).

In the embodiment illustrated in FIG. 2, output settings module 12 comprises output settings 44 comprising information and/or setting(s) for controlling the output characteristics of images generated from image capture zones 28, 30, 32 and/or 34. In the embodiment illustrated in FIG. 2, output settings 44 comprise a rotational setting 46 (e.g., user option to rotate the image, for example, from landscape to portrait or vice versa), an image file format setting 48 (e.g., option for selecting between a bitmap, a portable document format, or other file format), an exposure setting 50 (e.g. option for modifying the brightness or exposure level of the image) and/or a sharpness setting 52 (e.g., option for modifying the sharpness of the image) for each respective image capture zone 28, 30, 32 and/or 34. It should be understood that other output setting(s) 44 may also be provided (e.g., for different types of output characteristics).

In operation, embodiments of the present invention enable a user to select/change the desired output setting(s) 44 for one or more image capture zones 28, 30, 32 and/or 34 and/or objects 16 via output settings module 12. For example, a user may desire to have the scanned image of particular object(s) 16 (e.g., one or more objects 16 disposed within each of image capture zones 32 and 34 (FIG. 1)) rotated ninety (90) degrees clockwise to re-orient the scanned images of such object(s) 16 prior to transmitting the scanned images of the object(s) 16 to the selected destination, thereby enabling each of the scanned images (e.g., each of the photographs 20, 22, 24 and 26) to arrive at the selected destination in the same orientation. Additionally, the user may desire to simultaneously save the images generated by image capture device 10 in particular and/or different formats (e.g., the image(s) from image capture zone 28 as a bitmap format file and image(s) from image capture zones 30, 32 and 34 as portable document file formats). In the embodiment illustrated in FIG. 2, processor 38, user interface 36 and output settings module 12 are disposed within image capture device 10; however, it should be understood that user interface 36 and output settings module 12 may be otherwise located (e.g., on a remote computing device).

In some embodiments of the present invention, image capture device 10 performs a preview scan to detect object(s) 16 and display a reduced-size image 53 of such object(s) 16 on display 54, thereby enabling a user to select particular object(s) 16 and apply one or more desired output settings 44 to the particular object 16. It should be understood that more than one output setting 44 may be applied and/or otherwise associated with one or more objects concurrently (e.g., selecting both a rotation setting 46 and an exposure setting 50 and applying to one or more objects 16 concurrently). Further, it should be understood that such output settings 44 may also be applied to object(s) 16 without a preview scan. For example, in some embodiments of the present invention, output settings module 12 is configured to display each image capture zone 28, 30, 32 and/or 34 on display screen 54 and enable the user to select a particular image capture zone 28, 30, 32 and/or 34 and apply desired output settings 44 to the zone 28, 30, 32 and/or 34 (i.e., the setting 44 is applied to the object 16 within the particular zone without providing the user with a display of the object 16 within the zone). In some embodiments of the present invention, an output setting 44 selected for a particular image capture zone 28, 30, 32 and/or 34 is applied to each object 16 within a particular image capture zone 28, 30, 32 and/or 34 (e.g., applied to the scanned image of each object 16 disposed within a particular image capture zone). For example, if three business cards are disposed within image capture zone 28, each business card is independently detected and the output setting 44 automatically applied to the scanned image associated with each of the three business cards.

FIG. 3 is a flow diagram illustrating an embodiment of an output settings method for image capture device 10 in accordance with the present invention. In the embodiment illustrated and described in FIG. 3, image capture device 10 is configured to perform a preview scan. However, as described above, it should be understood that embodiments of the present invention also enable output setting 44 selection and/or application without performing a preview scan operation. The method begins at block 58, where image capture device 10 initiates a preview scan (e.g., generally a low resolution scan). At block 59, detection module 13 detects object(s) 16 and the locations thereof on platen 18. At block 60, object(s) 16 are displayed as preview image(s) 53 on display screen 54. At decisional block 62, a determination is made whether output settings 44 are to be applied to one or more object(s) 16. If output settings 44 are to be applied to one or more object(s) 16, the method proceeds to block 64, where output settings module 12 receives a selection of output settings 44 and corresponding object(s) 16 and/or zone(s) 28, 30, 32 and/or 34. At block 66, image capture device 10 performs a final scan to generate images of the object(s) 16. At block 67, output settings module 12 applies and/or otherwise causes the selected output settings 44 to be applied to the selected object(s) 16 and/or zone(s) 28, 30, 32 and/or 34. At block 68, image capture device 10 transmits the scanned images of object(s) 16 to a selected and/or desired destination.

Thus, for example, if a user desires to scan multiple objects 16 at once (e,g., four photographs 20, 22, 24, and 26), the objects must generally be aligned or oriented in a particular manner in order for the objects 16 to fit on platen 18 (e.g., as illustrated in FIG. 1). However, the orientation of the image on one or more object(s) 16 may not coincide with its "scan" orientation of the object 16 on platen 18. Embodiments of the present invention enable the user to automatically select particular object(s) 16 to be automatically re-oriented after the scanning operation and transmitted to a desired destination in the desired orientation, thereby alleviating a need for the user to perform additional post-scan image processing.

Thus, embodiments of the present invention enable a user to select various output settings 44 for particular object(s) 16 and/or image capture zones 28, 30, 32 and/or 34 that are automatically applied to the scanned images of the object(s) 16.

What is claimed is:

1. An image capture device, comprising:
   a platen with plural image capture zones;
   a detection module that detects borders of objects within each of the plural image capture zones; and
   an output settings module that receives user input to separately change output characteristics for scanned images of the objects within each of the plural image capture zones,
   wherein the detection module detects a presence of each of the objects in a corresponding image capture zone of the plural image capture zones.

2. The device of claim 1, wherein the output characteristics are different for each of the plural image capture zones.

3. The device of claim 1, wherein the user input includes image orientation, file type, image sharpness, and image exposure that are separately selectable for each of the plural image capture zones.

4. The device of claim 1, wherein the plural image capture zones are visually displayed on a display of a user interface so a user can select different output characteristics for each of the plural image capture zones before the objects are scanned.

5. The device of claim 1, wherein the user input is received before the objects are scanned, and the output characteristics are automatically applied to the scanned images of the objects after the objects are scanned.

6. The device of claim 1, wherein the scanned images of the objects are saved with different file formats as associated with each of the plural image capture zones.

7. The device of claim 1, wherein the plural image capture zones are four quadrants sized to receive photographs.

8. The device of claim 1, wherein the plural image capture zones are displayed on a display of a user interface without display of the objects within each of the plural image capture zones so a user can provide the user input to separately change the output characteristics.

9. The device of claim 1, wherein at least one output setting is automatically applied to at least one image capture zone of the image capture device.

10. The device of claim 1, wherein at least one output setting is automatically applied to a subsequently scanned image of at least one object.

11. An imaging device, comprising:
a platen with plural image capture zones, wherein each of the plural image capture zones is separately configurable to have different output characteristics that are applied to images of objects when the objects are scanned on the platen at each of the plural image capture zones, wherein the plural image capture zones are displayed on a display of a user interface without display of the objects within each of the plural image capture zones before the objects are scanned.

12. The device of claim 11, wherein the plural image capture zones are displayed on the display of the user interface before the objects are scanned so a user can select the different output characteristics that are applied to images of objects when the objects are scanned on the platen at each of the plural image capture zones.

13. The device of claim 11, wherein each of the plural image capture zones is separately configurable to have different image orientation, file type, image sharpness, and image exposure.

14. The device of claim 11, wherein the images of the objects are saved with different file formats as associated with different image capture zones of the plural image capture zones.

15. The device of claim 11, wherein the platen includes four image capture zones.

16. A method, comprising:
dividing a platen into plural image capture zones;
displaying the plural image capture zones on a display of a user interface without display of objects within each of the plural image capture zones;
configuring output characteristics for each of the plural image capture zones;
generating images of objects placed within each of the plural image capture zones; and
applying the output characteristics for each respective image capture zone to an image generated from an object in each respective image capture zone.

17. The method of claim 16, further comprising separately configuring the output characteristics at each of the plural image capture zones, wherein the output characteristics include a rotation setting, a file type setting, an exposure setting and a sharpness setting.

18. The method of claim 16, further comprising using a detection module to automatically detect within which of the plural image capture zones an object is located on the platen.

19. The method of claim 16, further comprising displaying a preview image of the objects on the display of the user interface.

20. The method of claim 16, further comprising displaying the plural image capture zones on the display of the user interface so a user can select different output characteristics for each of the plural image capture zones before the objects are scanned.

21. The method of claim 16, further comprising receiving user input to change the output characteristics before the objects are scanned, and automatically applying the output characteristics to the images of the objects after the objects are scanned.

22. The method of claim 16, further comprising associating different output characteristics for each of the plural image capture zones.

23. The method of claim 16, further comprising detecting two objects on different image capture zones on the platen, and saving images of the two objects with different file formats after a scan.

24. An imaging method, comprising:
detecting borders of objects within a corresponding image capture zone of a plurality of image capture zones of a platen of an image capture device, the objects to be concurrently imaged by the image capture device;
receiving output settings for images of the objects to be concurrently imaged by the image capture device, including separately configuring different output settings at each of the plurality of image capture zones; and
automatically applying the different output settings to different ones of the images of the objects being concurrently imaged.

25. The method of claim 24, further comprising dividing the platen into the plurality of image capture zones with each of the zones being configurable to apply a different output setting to an image of an object placed in a respective zone.

26. The method of claim 24, wherein the different output settings include a rotation setting, a file type setting, an exposure setting and a sharpness setting.

27. The method of claim 24, further comprising displaying the plurality of image capture zones on a display of a user interface without display of the objects within each of the plurality of image capture zones.

28. The method of claim 24, further comprising receiving a selection of a preview image of at least one object to associate with at least one output setting.

29. The method of claim 24, further comprising saving the images of the objects within different image capture zones of the platen with different file formats.

30. The method of claim 24, further comprising automatically applying at least one output setting to a subsequently scanned image of at least one object.

31. An image capture device, comprising:
a platen that receives a plurality of objects for concurrent imaging; and
an output settings module that receives output settings that are applied to images of objects generated by the image capture device, wherein different output settings are applied to images of objects placed at different locations on the platen without a preview scan,
wherein the objects placed at different locations on the platen are saved with different file formats.

32. The device of claim 31, wherein the different output settings are separately selectable for each of the different locations on the platen before images of the objects are generated and automatically applied to the images of the objects after the images are generated.

33. The device of claim 31, wherein the platen is divided into different zones with each of the different zones being configurable to apply different output settings to an image.

34. The device of claim 31, wherein the different output settings are applied after the objects are concurrently scanned.

* * * * *